United States Patent
Helt

(10) Patent No.: US 7,380,588 B2
(45) Date of Patent: Jun. 3, 2008

(54) HEAT PUMP CONTROL SYSTEM AND METHOD OF OPERATING TO PROVIDE AUTOMATIC BACKUP HEATING MODES

(75) Inventor: Robert W. Helt, Tyler, TX (US)

(73) Assignee: Trane International Inc., New York, NY (US)

( * ) Notice: Subject to any disclaimer, the term of this patent is extended or adjusted under 35 U.S.C. 154(b) by 385 days.

(21) Appl. No.: 10/755,579

(22) Filed: Jan. 12, 2004

(65) Prior Publication Data

US 2005/0150650 A1 Jul. 14, 2005

(51) Int. Cl.
*F25B 29/00* (2006.01)

(52) U.S. Cl. ............... 165/240; 165/241; 165/242; 237/2 B; 237/2 A; 62/238.6; 62/238.7; 62/160; 431/19; 431/24; 431/25

(58) Field of Classification Search ........... 165/240, 165/241, 242; 237/2 B, 2 A; 62/238.6, 62/238.7, 160; 431/160, 19, 24, 25
See application file for complete search history.

(56) References Cited

U.S. PATENT DOCUMENTS

| | | | | |
|---|---|---|---|---|
| 4,147,203 A | * | 4/1979 | Rayfield | 165/241 |
| 4,232,530 A | * | 11/1980 | Mueller | 62/160 |
| 4,246,763 A | * | 1/1981 | Mueller et al. | 62/160 |
| 4,301,660 A | * | 11/1981 | Mueller et al. | 62/126 |
| 4,445,567 A | * | 5/1984 | Nelson | 165/240 |
| 4,474,227 A | * | 10/1984 | Reedy | 237/2 A |
| 4,476,920 A | * | 10/1984 | Drucker et al. | 165/242 |
| 4,483,388 A | * | 11/1984 | Briccetti et al. | 165/241 |
| 4,627,483 A | * | 12/1986 | Harshbarger, III et al. | 237/2 A |
| 4,627,484 A | * | 12/1986 | Harshbarger, Jr. et al. | 237/2 A |
| 4,842,510 A | * | 6/1989 | Grunden et al. | 431/19 |
| 4,971,136 A | * | 11/1990 | Mathur et al. | 165/240 |
| 5,074,780 A | * | 12/1991 | Erdman | 431/24 |
| 5,076,780 A | * | 12/1991 | Erdman | 431/24 |
| 5,259,445 A | * | 11/1993 | Pratt et al. | 165/241 |
| 5,405,079 A | * | 4/1995 | Neeley et al. | 237/2 B |
| 5,622,310 A | * | 4/1997 | Meyer | 236/46 R |
| 5,722,822 A | * | 3/1998 | Wilson et al. | 431/25 |
| 5,918,668 A | * | 7/1999 | Trimble | 165/240 |
| 7,032,397 B1 | * | 4/2006 | Mueller et al. | 62/230 |

\* cited by examiner

*Primary Examiner*—John K Ford
(74) *Attorney, Agent, or Firm*—William O'Driscoll

(57) ABSTRACT

A heat pump type heating and air conditioning system includes a gas furnace or other auxiliary heat source and a thermostat and controller associated with the heat pump and the auxiliary heat source for automatically energizing the heat pump if the auxiliary heat source is inoperative regardless of whether or not the automatic heating mode has been selected or the auxiliary heating mode has been selected by the user of the system. A method of operating a heat pump system with an auxiliary heating source to automatically change from operation of the heat pump to the auxiliary heating source depending on conditions such as outdoor temperature, and to automatically change back to operation of the heat pump if the auxiliary heating source is inoperable.

21 Claims, 3 Drawing Sheets

HEAT PUMP CONTROL SYSTEM AND METHOD OF OPERATING TO PROVIDE AUTOMATIC BACKUP HEATING MODES

BACKGROUND

Heat pump systems for residential and commercial applications often include independent auxiliary heating sources to provide heat when the system load is greater than can be satisfied by operation of the heat pump alone. Heat pump systems are often provided with fossil fuel auxiliary heating sources or furnaces, although electric resistance grid heaters or other sources may also serve as auxiliary or backup heaters. Typically, heat pump systems with auxiliary heat sources are operated such that the fossil fuel or electric backup heater and the heat pump are not operated at the same time to avoid placing excess thermal stresses on the heat pump part of the system.

Moreover, conventional heat pump systems are usually manufactured and shipped to the end user with a controller, including a thermostat. If a fossil fuel or electric resistance heater is installed later, an additional control device and associated wiring must be provided to modify control of the system to allow the heat pump and the auxiliary heat source or furnace to work together. It is desirable to eliminate such an additional control device, the wiring associated therewith and the effort to install the device when a heat pump system is modified to include an auxiliary or backup heat source, such as a fossil fuel furnace, electric resistance heater or other source of auxiliary heat.

Moreover, in certain instances the auxiliary or backup source of heat may fail to operate properly. With conventional prior art systems, the heat pump is not called on to restart to provide whatever heat it is capable of providing. Thus, in such prior art systems there is complete failure to provide heat, even though the heat pump portion of the system is operable to provide at least enough heat to prevent substantial discomfort to the occupants of the space to be heated or prevent a more catastrophic event. It is to overcome deficiencies of prior art heat pump systems with auxiliary heat sources that the present invention has been developed.

SUMMARY OF THE INVENTION

The present invention provides a heat pump system which includes an auxiliary heating source with an improved control arrangement and method which will provide for automatic operation of the heat pump in the event that the auxiliary heat source fails to operate.

In accordance with one aspect of the present invention, a control system for a heat pump with auxiliary heating is provided which, in a normal mode of operation, provides for operation of the heat pump to satisfy the heat requirement. If the heat pump alone cannot satisfy the heat requirement, the control system deenergizes the heat pump and energizes the auxiliary heating source, such as a gas or other fossil fuel furnace or other type of auxiliary or backup heat source. In accordance with the present invention, if the auxiliary heat source is not operative, the system automatically returns to operation of the heat pump to satisfy, at least partially, the demand of the space being heated. The system and method of the invention also provide for automatic operation of an auxiliary or backup heat source if the heat pump fails to provide sufficient heat to the controlled space.

Still further, the control system and method of the invention are operable to provide for restarting a heat pump if the auxiliary or backup heat source fails, even if user settable controls for the system have been manually set to the auxiliary heating mode.

Still further, the system and method of the invention provide for using a signal from a high pressure switch of a heat pump in place of a high temperature limit switch in the system.

Those skilled in the art will further appreciate the above mentioned advantages and superior features of the invention, together with other important aspects thereof, upon reading the detailed description which follows in conjunction with the drawings.

DETAILED DESCRIPTION OF THE PREFERRED EMBODIMENTS

In the description which follows, certain elements may be described generally and shown in schematic form in the interest of clarity and conciseness.

Figure 1:
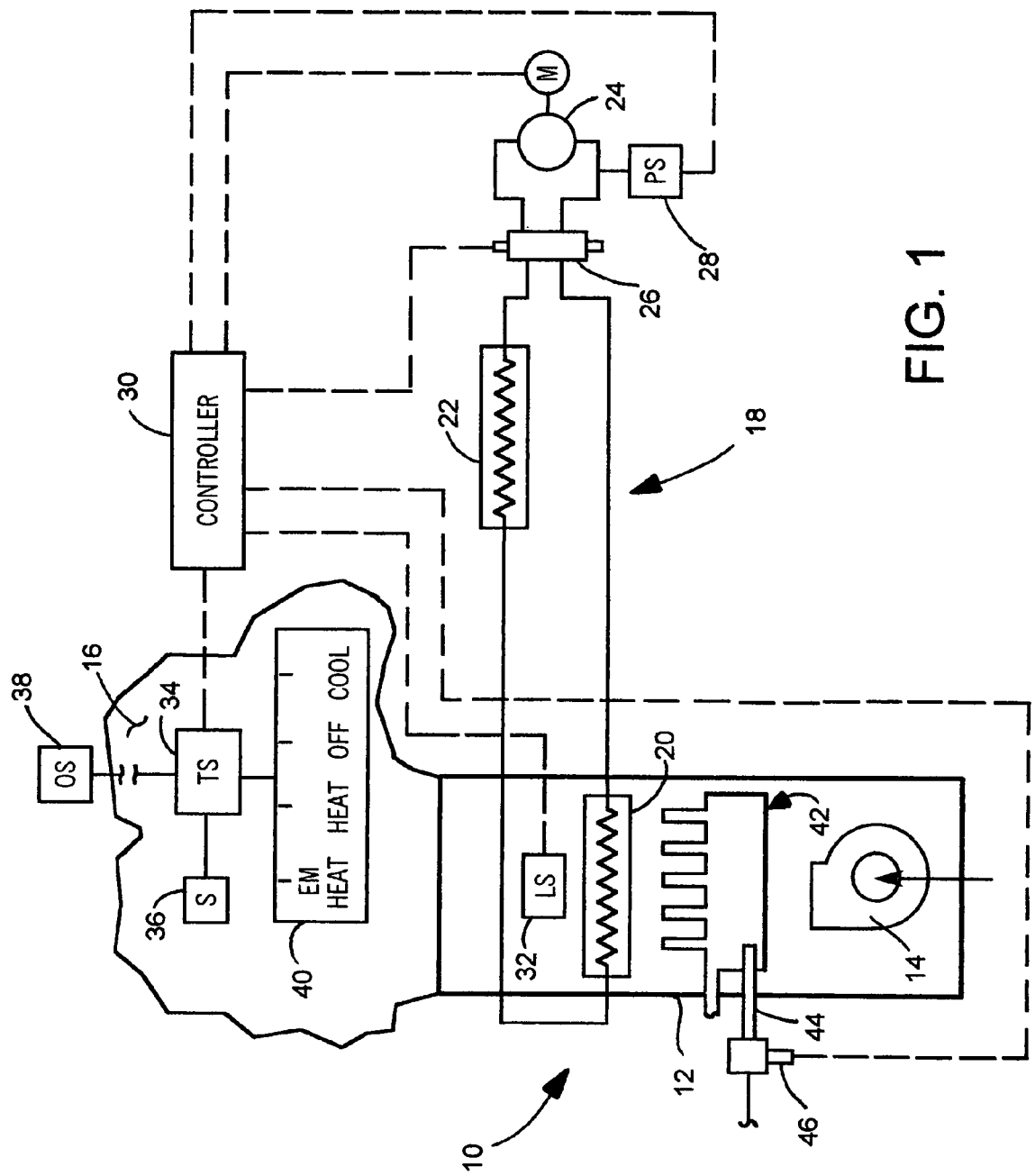
FIG. 1 is a schematic diagram of a heat pump system with an auxiliary heating source and including a thermostat and control system in accordance with the present invention.

Referring to FIG. 1, there is illustrated a schematic diagram of a heat pump system with an auxiliary heating source comprising a fossil fuel furnace and generally of the type used for residential dwelling air conditioning purposes. The system shown in FIG. 1 comprises an air conditioning system 10 characterized by a cabinet 12 in which a motor driven blower or fan 14 is disposed for circulating air to and from an enclosed space 16 in a conventional manner. The system 10 includes a heat pump 18 characterized by a reversible vapor compression fluid flow circuit including a first heat exchanger 20 disposed within the cabinet 12 and a second heat exchanger 22, typically an outdoor air cooled type condenser unit, for example. The heat exchangers 20 and 22 are disposed in a closed fluid flow circuit including a motor driven compressor 24, a circuit flow reversing valve 26 and circuitry, as shown, for circulating a refrigerant fluid through the heat exchangers 20 and 22. Certain conventional components, such as expansion devices and check valves for proper circulation of the refrigerant fluid, have been omitted from the schematic diagram of FIG. 1.

The heat pump 18 typically includes a high pressure/low pressure limit switch 28 interposed in the refrigerant fluid circuit to provide a signal to a controller 30 indicating excessive fluid pressure in the refrigerant circuit or inadequate pressure in the refrigerant circuit. The air conditioning system 10 may also include a high temperature limit switch 32 disposed in the cabinet 12 and operably connected to the controller 30. The controller 30 may be integrated with a so-called thermostat device 34 disposed in the enclosed space 16 and having a temperature sensor 36 for sensing temperature in the enclosed space. Thermostat device 34 may include an outdoor ambient air temperature sensor 38 also. The thermostat part of the controller 30 may also include a multi-position switch 40 whereby the user of the system 10 may select a heating mode, an off mode, a cooling mode, and an auxiliary or an emergency heating mode, as indicated, and known to those skilled in the art.

The thermostat/controller 30/34 is operable, upon selection of the operating mode by the user of this system 10, to provide heat to the space 16 when the temperature in the space 16 decreases to a certain point below a setpoint of the thermostat sensor 36, which setpoint may be selected also by a user of the system 10. In many applications of heat pump systems, an auxiliary heat source must be included in the system to satisfy the heating demand requirements under climatic conditions or other operating conditions which cannot be satisfied by the heat pump itself. In the system 10, for example, an auxiliary heat source in the form of a gas furnace 42 is disposed in the cabinet 12 and is operable to provide heat to satisfy the demand of the enclosed space 16 in operating conditions under which the heat pump 18 cannot satisfy such demand. The auxiliary heat source or furnace 42 includes a fossil fuel (gas) burner 44 connected to a source of fuel by way of a remotely controllable valve 46 operably connected to the controller/thermostat 30/34. Other forms of auxiliary heat sources may be used including electric resistance grid furnaces, steam heaters and the like, not shown.

Accordingly, the controller/thermostat 30/34 may be provided with a manual signal input by a user of the system 10 by selecting the "EM HEAT" setting of the switch 40 (which may also be indicated as auxiliary heat) if the user is aware that the heat pump 18 will not satisfy the heating demand. Otherwise, the user of the system 18 would normally place the switch 40 in the "HEAT" position to allow the system to operate in a mode which typically would operate the heat pump 18 to satisfy the heating requirements of the space 16 and, if the heat pump was unable to do so, deenergize or shut down the heat pump 18 and commence operation of the auxiliary heat source or furnace 42.

However, in conventional heat pump systems with auxiliary heating sources, if the auxiliary heating source fails or cannot satisfy the demand of the space 16, the heat pump 18 will not restart to provide whatever output it is capable of providing. Clearly, it would be desirable in many situations to provide for this mode of operation. For example, in residential dwelling applications of the system 10, if the auxiliary heat source failed to operate it would be desirable to utilize whatever heat output the heat pump 18 was capable of to prevent the temperature in the space 16 from dropping below a point of extreme discomfort for the occupants of the space or to a temperature which might result in damage to the dwelling or its contents.

The present invention provides a controller/thermostat 30/34 which is operable to cause the system 10 to divert to operation of the heat pump 18 if the auxiliary heating source, such as the gas furnace 42, fails to operate or fails to satisfy the demand of the space 16 whether or not the switch 40 is placed in the auxiliary heat operating mode "EM HEAT" or the more automatic "HEAT" operating mode. The controller/thermostat 30/34 may include a programmable or preprogrammed control circuit which is operably connected to the heat pump 18 and to the auxiliary heat source 42 to accomplish these ends. The control circuit within the controller/thermostat 30/34 may comprise a programmable microcontroller of a type commercially available and which may be programmed by one of ordinary skill in the art to carry out the method of the invention.

Figure 2A:
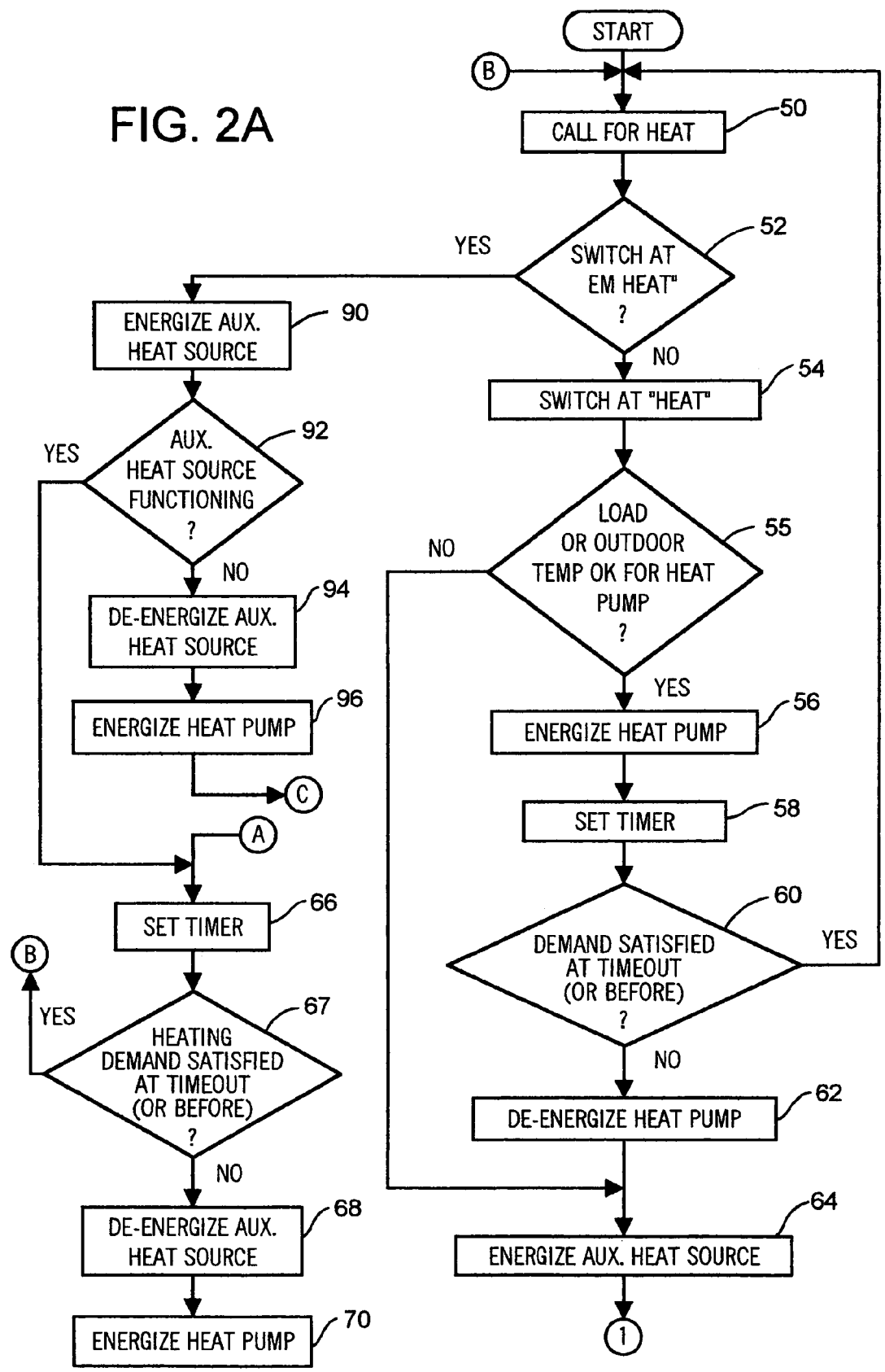
FIGS. 2A and 2B comprise a flow diagram illustrating certain operating steps in accordance with a method of the present invention.
Figure 2B:
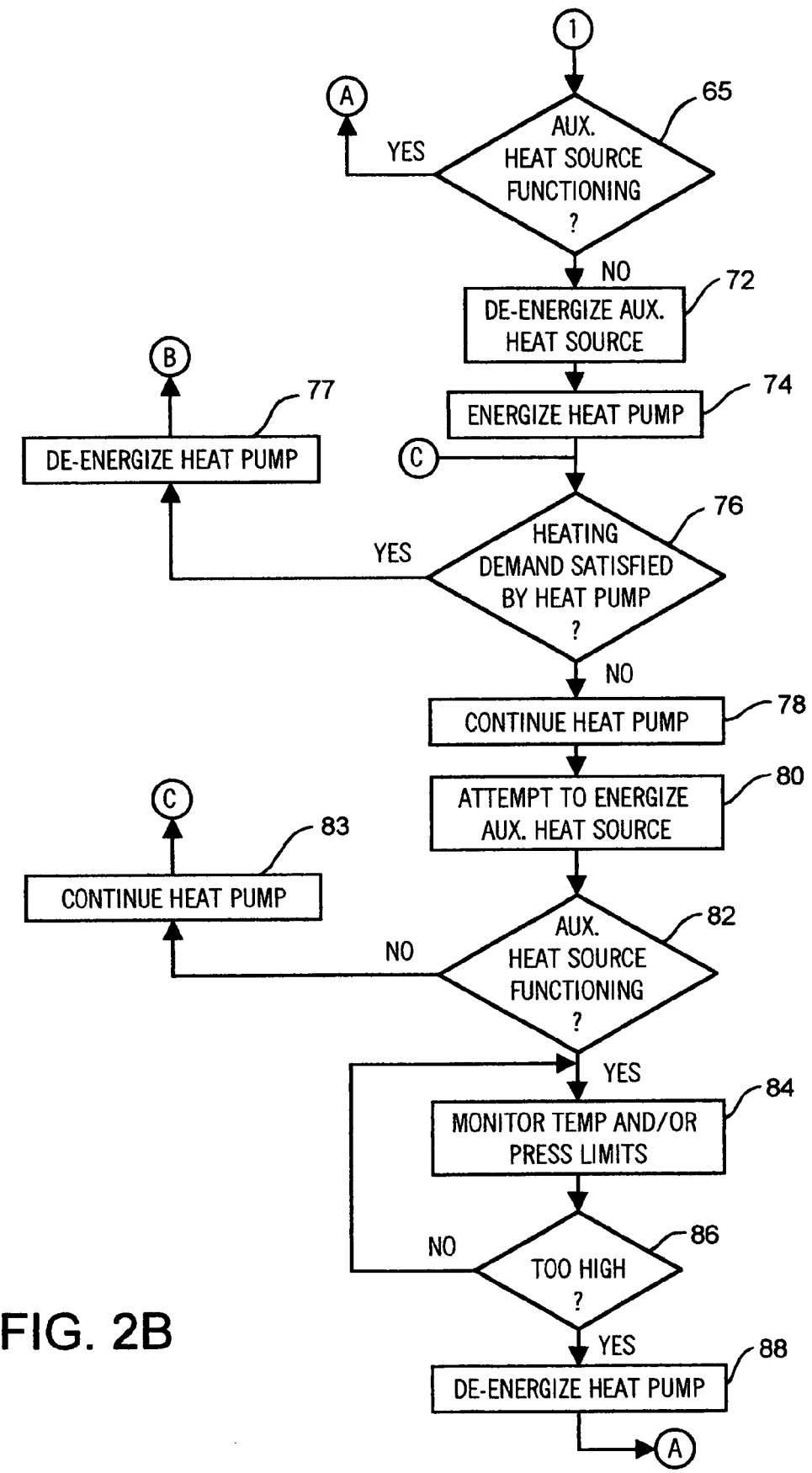

Referring to FIG. 2A, there is illustrated a somewhat simplified flow diagram in accordance with the system and method of the invention. FIG. 2B is a continuation of the flow diagram shown in FIG. 2A. Certain routine steps normally included in operation of a combustion or fossil fuel furnace have been omitted in the interest of conciseness. However, the steps which include methodology in accordance with the present invention are indicated in the diagram. The letters Y and N designate "yes" and "no", respectively. The general methodology of the invention provides for operation of the system 10 by the controller/thermostat 30/34 in the following modes. If the operator or user of this system 10 has selected the "HEAT" position of the switch 40, when the temperature sensor 36 indicates a temperature at or slightly below the setpoint, a call for heat is indicated at step 50.

The process first identifies the thermostat setting of switch 40 for the respective heating modes of the system 10, as indicated at steps 52 and 54. If the switch 40 is set at "HEAT," the process next queries the thermostat 34 at step 55 to determine if the outdoor temperature sensed by sensor 38 is suitable to provide heat from the heat pump 18. If the controller 30 determines that operating conditions are suitable for heat pump operation, the heat pump 18 will be energized at step 56 to supply heat to the space 16 and as long as that mode of operation satisfies the heat requirements of the space 16 in accordance with the thermostat setting, system operation will be carried out using the heat pump operating mode only. Typically, a timer is set at step 58. If the heating demand is satisfied at or before timeout of the timer setting, then the system returns to the start condition, see step 60.

However, if the heat pump 18 is unable to satisfy the demand of the space 16 in accordance with the setpoint of the thermostat 34, at a predetermined time after the call for heat, such as fifteen minutes to thirty minutes, if the temperature sensed is at or below a temperature less than the setpoint, such as 2° F. to 320 F., for example, the heat pump 18 will be shutoff at step 62 and the auxiliary heat source 42 will be energized at step 64. The heat pump 18 is normally deenergized to prevent excessive thermal stresses on the heat exchanger 20, for example.

Operation of the heat pump 18 may be bypassed at step 55 to operation of the auxiliary heating source 42 automatically if, for example, the outside temperature sensor 38 indicates that the heat pump will be unable to meet the demand of the space 16, as determined by controller 30, or other conditions are so extreme that the heat pump will not be able to operate properly in the heating mode.

Referring further to FIGS. 2A and 2B, upon energization of the auxiliary heat source 42 at step 64, if the controller 30 determines that the auxiliary heat source 42 is functioning at step 65, FIG. 2B, the process flow may continue via the path indicated by the connection comprising the encircled A. Signals from the gas valve 46 and/or the temperature sensor/limit switch 32, for example, may be input to the controller 30 to indicate whether or not the auxiliary heat source 42 is functioning. A timer may be set at step 66, FIG. 2A. If the heating demand of the space 16 is satisfied at or before timeout of the timing function set at step 66, see step 67, operation of the system will be such as to deenergize the auxiliary heat source and return the process to the beginning as indicated by the flow line connected by the encircled B.

However, if the heating demand is not being satisfied at step 67, FIG. 2A, the controller 30 will deenergize the auxiliary heat source at step 68 and energize the heat pump 18 at step 70. Moreover, if the auxiliary heat source 42 is not functioning at step 65, it is deenergized at step 72 and the heat pump 18 is energized at step 74 to attempt to satisfy the demand for heat called by the thermostat 34. In this way, the space 16 may be kept at a temperature which will avoid extreme discomfort of occupants of the space or at least prevent major damage to facilities defining the space 16. However, if the heat pump 18 satisfies the heating demand at step 76, the heat pump 18 is deenergized at step 77 and the process reverts to the starting condition.

Alternatively, the process indicated in FIGS. 2A and 2B may provide for operation of the heat pump 18 and the auxiliary heat source 42 simultaneously if a limit temperature is not exceeded in the cabinet 12 as sensed by a sensor in limit switch 32 or by a pressure sensor in pressure switch 28, for example. Thus, the heating demand for the space 16 may be satisfied by the combination of heat sources, such as the heat pump 18 and the auxiliary source 42. Moreover, if either one of the heat sources fails, the other one may be commanded to continue operating until the call for heat is terminated by the thermostat 34.

Referring to FIG. 2B, if the heating demand is not satisfied at step 76, the heat pump continues to operate at step 78 and an attempt is made to start the auxiliary heat source 42 at step 80. If the auxiliary heat source 42 starts functioning at step 82, the high temperature and high pressure limit switches 32 and 28 are monitored at step 84 and, if the temperature in the system, as indicated by either, is too high, step 86, the heat pump is deenergized at step 88 and the process is reentered at the encircled letter A. If the auxiliary heat source is not functioning at step 82, the heat pump 18 continues to operate at step 83 and the process continues from the encircled letter C. A suitable time delay may be built into the process at step 76 to prevent rapid repetitious attempts to start the heat source 42.

Referring again to FIG. 2A, if the user of the space 16 has set the selector switch 40 at emergency or auxiliary heat (EM HEAT), as indicated at step 52, then at the call for heat the auxiliary heat source 42 is energized at step 90 and a determination is made at step 92 as to whether or not heat source 42 is functioning. If heat source 42 is functioning the timer is set at step 66. Again, if the heating demand is satisfied at step 67 before the time set by the timer has elapsed, the system will return to the "Start" mode as indicated in FIG. 2A. However, if the heat source 42 is not functioning at step 92, it is deenergized at step 94 and the heat pump 18 is energized at step 96 and the process continues at the encircled letter C in FIG. 2B.

Still further, in place of setting a timer and monitoring the heating demand condition at timeout of the timer, as indicated in steps 58 and 60 and steps 66 and 67, the temperature sensed by the sensor 36 may be monitored by the controller 30 while the auxiliary heating source 42 is operable to determine if there is any failure of the auxiliary source to begin to meet or continue to meet the demand of the space 16. Accordingly, in this alternative mode of operation, if the rate of rise of the temperature in the space 16 as sensed by sensor 36 is less than a predetermined amount, this parameter may be used to deenergize the auxiliary heat source 42 and energize the heat pump 18 in an effort to satisfy the heating demand of the system.

Accordingly, a controller/thermostat in accordance with the present invention may be an integrated unit in which essentially all of the control functions which require calling for heat and operating a heat pump and/or an auxiliary heat source may be provided in accordance with the invention and installed on all heat pump units manufactured and sold by an entity. In this way, if a system is sold without an auxiliary heat source but that source is added later, then a thermostat/controller in accordance with the invention will be operable to provide the method of the present invention without the addition of further control devices and associated wiring. Of course, if a system, such as the system 10, is produced initially with an auxiliary heat source, then a thermostat and controller in accordance with the invention will be operable to provide the operating method of the invention straight away.

A system, such as the system 10, may be provided by those of ordinary skill in the art using conventional components. A thermostat and/or controller in accordance with the invention may also be provided using programmable circuitry commercially available and programmed to operate in accordance with the method of the invention. Although preferred embodiments of the invention have been described in detail herein, those skilled in the art will also recognize that various substitutions and modifications may be made without departing from the scope and spirit of the appended claims.

What is claimed is:

1. A method for operating a heating system when a second heat source fails to supply sufficient heat, comprising the steps of:
    providing a heating system having a first and a second heat source;
    connecting the heating system to a space of a residential dwelling or commercial building to provide heat thereto;
    energizing the first heat source at a first call for heating said space;
    judging whether the first heat source is unable to provide the heating requirements of the space;
    deenergizing the first heat source and energizing the second heat source if said first heat source is unable to provide the heating requirements of said space;
    judging whether the second heat source failed to supply sufficient heat to the space;
    providing a signal indicating failure of said second heat source to provide sufficient heat to said space; and
    re-energizing said first heat source in response to the signal indicating failure of the second heat source to provide sufficient heat for the space.

2. The method set forth in claim 1 including the step of: providing said first heat source as a heat pump.

3. The method set forth in claim 2 and including the step of:
    providing said heat pump with a pressure limit switch and deenergizing said heat pump if said pressure limit switch indicates a pressure of fluid in said heat pump outside of a predetermined range of pressures.

4. The method set forth in claim 1 including the step of: sensing a parameter associated with operation of said second heat source to determine the operational status of said second heat source.

5. The method set forth in claim 4 wherein:
    the step of sensing a parameter associated with operation of said second heat source is selected from a group consisting of sensing a lack of flame from said second heat source, sensing closure of a combustion fluid supply valve to said second heat source and sensing a temperature in a cabinet containing said second heat source.

6. The method set forth in claim 1 including the step of: setting a timer upon energization of said second heat source and energizing said first heat source upon reaching an elapsed time set by said timer.

7. The method set forth in claim 1 wherein:
    operably connecting said first heat source and said second heat source to a controller for said system, and including, in the controller, a heating mode selection switch settable to a condition which will automatically select operation of said first heat source and then said second heat source and, upon inoperability of said second heat source, again select said first heat source.

8. The method set forth in claim 1 wherein:
providing a controller including a switch for manually selecting operation of said second heat source, and
causing operation of said first heat source when said system is in an operating mode comprising manual selection of said second heat source under the conditions wherein said second heat source is one of inoperative and unable to satisfy a demand for heat.

9. A method for operating a heating system comprising the steps of:
providing a heating system including a heat pump and an auxiliary heat source, a thermostat including a sensor for sensing the temperature in an enclosed space to be heated by said heating system, said thermostat including a heating mode selection switch including a heat mode position and an auxiliary or emergency heat mode position, and a controller operably connected to said thermostat and to said heating system;
responding to a call for heat from said thermostat by determining the position of said selection switch and responding to said selection switch being at said heat position to energize said heat pump;
deenergizing said heat pump if the demand for heat provided by said heat pump is not satisfied;
energizing said auxiliary heat source and determining if said auxiliary heat source is operable; and
deenergizing said auxiliary heat source and energizing said heat pump if said auxiliary heat source is one of inoperable and failing to satisfy the heating demand of said space.

10. The method set forth in claim 9 including the steps of:
determining if operating conditions are suitable for operation of said heat pump prior to energizing said heat pump; and
energizing said auxiliary heat source if said operating conditions are not suitable for operation of said heat pump.

11. The method set forth in claim 10 wherein:
the step of determining operating conditions includes sensing ambient outdoor air temperature.

12. The method set forth in claim 9 including the steps of:
energizing said auxiliary heat source if said selection switch is at said auxiliary heat mode position;
determining if said auxiliary heat source is one of functioning and meeting a demand for heat in said space; and
deenergizing said auxiliary heat source and energizing said heat pump if said auxiliary heat source is one of inoperable and failing to satisfy the demand for heat in said space.

13. The method set forth in claim 9 including the steps of:
continuing operation of said heat pump;
attempting to energize said auxiliary heat source;
monitoring one of temperature limits and fluid pressure limits in said heating system; and
deenergizing said heat pump if a temperature or pressure limit condition is reached during operation of both said auxiliary heat source and said heat pump.

14. The method set forth in claim 9 including the steps of:
initiating a time delay upon commencing operation of said auxiliary heat source; and
deenergizing said auxiliary heat source and energizing said heat pump if said auxiliary heat source is not supplying heat to said space at a predetermined rate.

15. The method set forth in claim 9 including the steps of:
monitoring heating demand of said space when said heat pump is providing heat thereto; and
deenergizing said heat pump and energizing said auxiliary heat source if said heat pump fails to satisfy said demand for heating of said space at a predetermined rate.

16. The method set forth in claim 9 including the steps of:
monitoring a signal from a pressure switch in a fluid flow circuit of said heat pump; and
deenergizing said heat pump if said signal from said pressure switch indicates a high limit pressure in said fluid flow circuit.

17. A method for operating a heating system comprising the steps of:
providing a heating system including a heat pump and an auxiliary heat source, a thermostat including a sensor for sensing the temperature in an enclosed space to be heated by said heating system, said thermostat including a heating mode selection switch including a heat mode position and an auxiliary or emergency heat mode position, and a controller operably connected to said thermostat and to said heating system
responding to a call for heat from said thermostat by determining the position of said selection switch and responding to said selection switch being at said auxiliary or emergency heat position to energize said auxiliary heat source;
monitoring selected operating parameters of said auxiliary heat source to determine if said auxiliary heat source is operable; and
deenergizing said auxiliary heat source and energizing said heat pump if said auxiliary heat source is one of inoperable and failing to satisfy the heating demand of said space.

18. The method set forth in claim 17 including the steps of:
continuing operation of said heat pump;
attempting to energize said auxiliary heat source;
monitoring one of temperature limits and fluid pressure limits in said heating system; and
deenergizing said heat pump if a temperature or pressure limit condition is reached during operation of both said auxiliary heat source and said heat pump.

19. The method set forth in claim 17 including the steps of:
initiating a time delay upon commencing operation of said auxiliary heat source; and
deenergizing said auxiliary heat source and energizing said heat pump if said auxiliary heat source is not supplying heat to said space at a predetermined rate.

20. The method set forth in claim 17 including the steps of:
monitoring heating demand of said space when said heat pump is providing heat thereto; and
deenergizing said heat pump and energizing said auxiliary heat source if said heat pump fails to satisfy said demand for heating of said space at a predetermined rate.

21. The method set forth in claim 17 including the steps of:
monitoring a signal from a pressure switch in a fluid flow circuit of said heat pump; and
deenergizing said heat pump if said signal from said pressure switch indicates a high limit pressure in said fluid flow circuit.

* * * * *

UNITED STATES PATENT AND TRADEMARK OFFICE
CERTIFICATE OF CORRECTION

| | |
|---|---|
| PATENT NO. | : 7,380,588 B2 |
| APPLICATION NO. | : 10/755579 |
| DATED | : June 3, 2008 |
| INVENTOR(S) | : Robert W. Helt |

Page 1 of 1

It is certified that error appears in the above-identified patent and that said Letters Patent is hereby corrected as shown below:

Column 4, Line 30, "320 F" should read --3° F--.

Signed and Sealed this

Twenty-fourth Day of February, 2009

JOHN DOLL
*Acting Director of the United States Patent and Trademark Office*